United States Patent
Di Nicolantonio

[11] Patent Number: 6,047,477
[45] Date of Patent: *Apr. 11, 2000

[54] COMPASS SAW

[75] Inventor: Aldo Di Nicolantonio, Recherswil, Switzerland

[73] Assignee: Scintilla AG, Solothurn, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/913,895

[22] PCT Filed: Feb. 21, 1996

[86] PCT No.: PCT/EP96/00701

§ 371 Date: Sep. 11, 1997

§ 102(e) Date: Sep. 11, 1997

[87] PCT Pub. No.: WO96/28273

PCT Pub. Date: Sep. 19, 1996

[30] Foreign Application Priority Data

Mar. 16, 1995 [DE] Germany ............................ 195 09 544

[51] Int. Cl.⁷ .................................................. B23D 49/00
[52] U.S. Cl. ............................ 30/392; 83/699.21; 279/91
[58] Field of Search ............................ 30/392, 393, 394; 83/699.21, 746; 279/76, 87, 89, 90, 91

[56] References Cited

U.S. PATENT DOCUMENTS

| | | | |
|---|---|---|---|
| 2,639,737 | 5/1953 | Forsberg | 30/392 |
| 2,703,716 | 3/1955 | Shore . | |
| 3,663,028 | 5/1972 | King, Jr. et al. . | |
| 3,665,983 | 5/1972 | Wagner et al. . | |
| 3,750,283 | 8/1973 | Hoffman | 30/338 |
| 4,299,402 | 11/1981 | Hoffman . | |
| 5,165,173 | 11/1992 | Miller | 30/392 |
| 5,306,025 | 4/1994 | Langhoff | 30/392 X |
| 5,402,580 | 4/1995 | Seto et al. | 30/392 X |

FOREIGN PATENT DOCUMENTS

| | | |
|---|---|---|
| 0 544 129 A1 | 6/1993 | European Pat. Off. . |
| 0 623 413 A1 | 11/1994 | European Pat. Off. . |
| 4102011A1 | 12/1991 | Germany . |
| 43 13 718 A1 | 11/1994 | Germany . |

*Primary Examiner*—Kenneth E. Peterson
*Attorney, Agent, or Firm*—Michael J. Striker

[57] ABSTRACT

In a sabre saw machine (10), having a device (20; 120) for chucking the saw blade (22; 122) on the lower end of its reciprocating rod (18; 118), wherein a chucking tube (34; 134), disposed so as to be axially displaceable by rotation on the reciprocating rod (18; 118), has an inward-protruding encompassing collar (42; 142) on its free lower end, the collar having a through opening (44; 144) and a radial slot (45; 145); wherein the collar (42; 142) in the chucking position is braced axially against lugs (68; 69; 168, 169) of the chucking end (23; 123) of the saw blade (22; 122) and thus puts it in contact with the lower face end of the reciprocating rod (18; 118) or keeps it pressed against a resilient centering piece (56; 156); wherein the reciprocating rod (18; 118) is guided in one upper and one lower reciprocating rod bearing (26, 27; 26', 27'), the guidance of the reciprocating rod (18) is improved in that the reciprocating rod (18; 118) is guided in the lower reciprocating rod bearing (27) by means of the chucking tube (34; 134), and the chucking tube (34; 134), in particular jointly with the chucking end (23; 123) of the saw blade (22; 122), passes through the reciprocating rod bearing (27; 127) in the stroke of the reciprocating rod (18, 118).

9 Claims, 6 Drawing Sheets

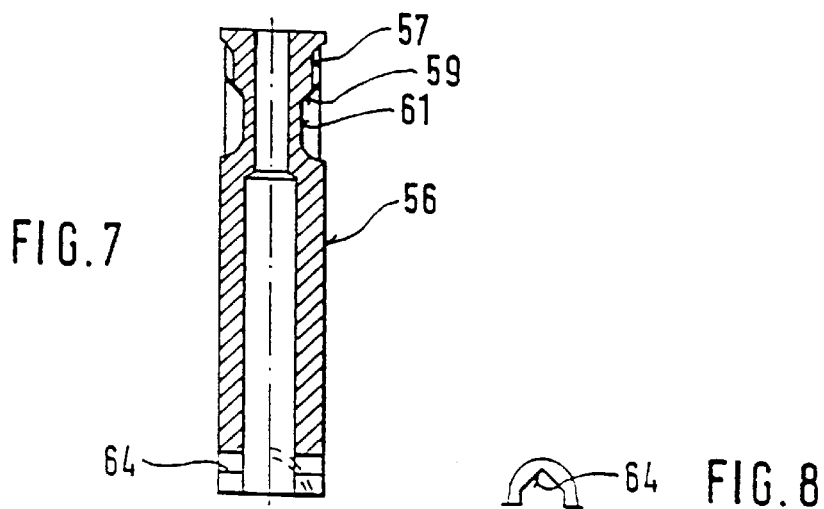
FIG. 7
FIG. 8
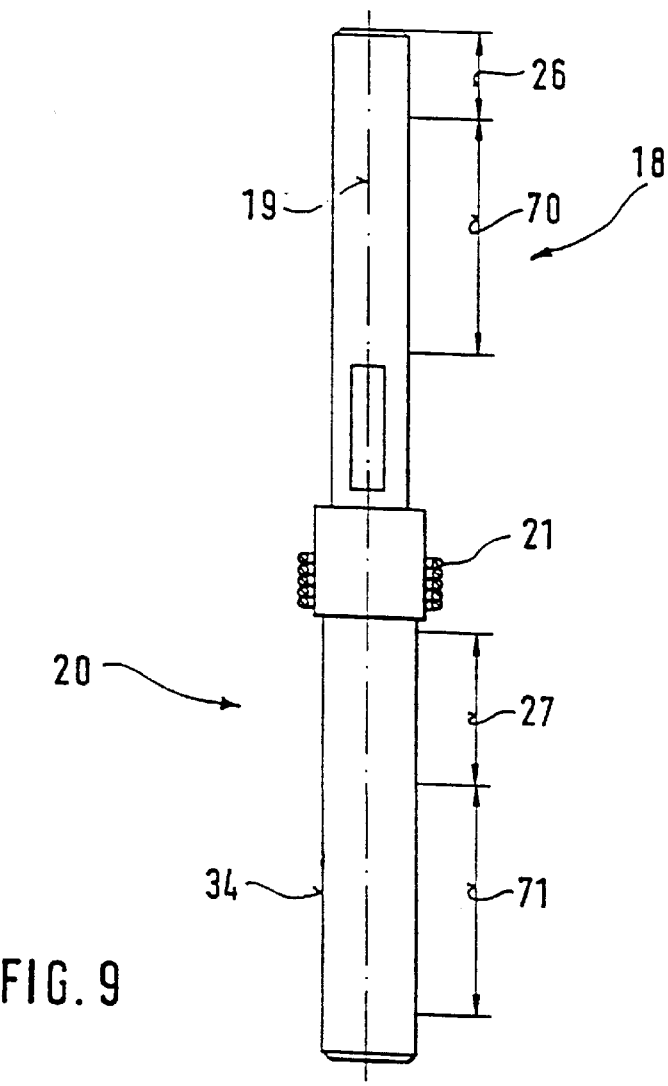
FIG. 9

COMPASS SAW

BACKGROUND OF THE INVENTION

The invention is based on a sabre saw.

From Published, Non-Examined German Patent Application DE-OS 41 02 011, a sabre saw is already known whose reciprocating rod, on its lower end, receives the chucking end of a saw blade with two opposed lugs extending crosswise to the longitudinal axis of the saw blade. The chucking end of the saw blade is introduced axially into the reciprocating rod until the lugs on their ends meet the lower end of the reciprocating rod.

A centering slot for receiving the saw blades is disposed inside the end of the reciprocating rod. This slot is optimally inclined only for centering saw blades of a single predetermined thickness. Since many saw blades exist with different thicknesses for the most various intended uses, sabre saws must be capable of receiving if at all possible all types of saw blade, in other words saw blades of any thickness, for the sake of universal utility.

The centering slot for receiving the saw blade lugs is therefore so wide that even the thickest saw blade fits into it. As a result, saw blades of lesser thickness have a certain lateral play within the centering slot. Because of this play of the chucking end, the danger of torsional and fluttering motions of the saw blade exists for the saw blades of lesser thickness, which are vulnerable to bending and twisting.

U.S. Pat. No. 3,750,283 discloses a sabre saw whose chucking device for the saw blades holds the lugs on its face end in V-shaped grooves and keeps the free end of the chucking end centered in a conical bore. As a result, regardless of its thickness, the saw blade finds a firm seat. The device for chucking saw blades functions securely and reliably. It circumferentially engages the reciprocating rod with a chucking tube and spring. However, this has the disadvantage that the lower diameter region of the end of the reciprocating rod opposite the upper end of the reciprocating rod is enlarged in steplike fashion. This is a visual obstacle for the user that hides the blade of the saw blade when the user is working with the sabre saw. Moreover, this saw blade chucking device is exposed to dust and metal chips, so that soiling can cause it to seize and make it harder to release the chucking device or change the saw blade.

SUMMARY OF THE INVENTION

The sabre saw of the invention has the advantage over the prior art that saw blades of all thickness can be chucked, all with the same high chucking quality. Consequently regardless of the thickness of the saw blades, the same good wording results are attainable with the sabre saw in all cases, using this chucking device.

The sabre saw of the invention also has the advantage that a very long bearing spacing between the upper reciprocating rod bearing and the lower reciprocating rod bearing can be chosen for the reciprocating rod; the lower reciprocating rod bearing circumferentially engages the device for chucking the saw blade. As a result, the device for chucking the saw blade indirectly guides the reciprocating rod.

This has the advantage that the interface between the reciprocating rod and the device for chucking the saw blade is shifted into the interior of the gear box and protected against dust and chips, and moreover is lubricated by the gear grease.

As a result, the torsion spring for tightening the chucking tube can be wrapped around the outside of the chucking tube instead of being disposed in the interior of the reciprocating rod. As a result, the function of the torsion spring is not impaired by a possibly too tightly attached chucking tube.

BRIEF DESCRIPTION OF THE DRAWING

Exemplary embodiments of the present invention are described in further detail in the ensuing description in conjunction with the associated drawing.

FIG. 7 shows a longitudinal section of the centering tube of FIG. 3;

FIG. 8 shows the detail of the centering slot in a side view of FIG. 7;

FIG. 9 is a side view of the component group comprising the reciprocating rod and the chucking device of FIG. 3;

DESCRIPTION OF THE PREFERRED EMBODIMENTS

Figure 1:
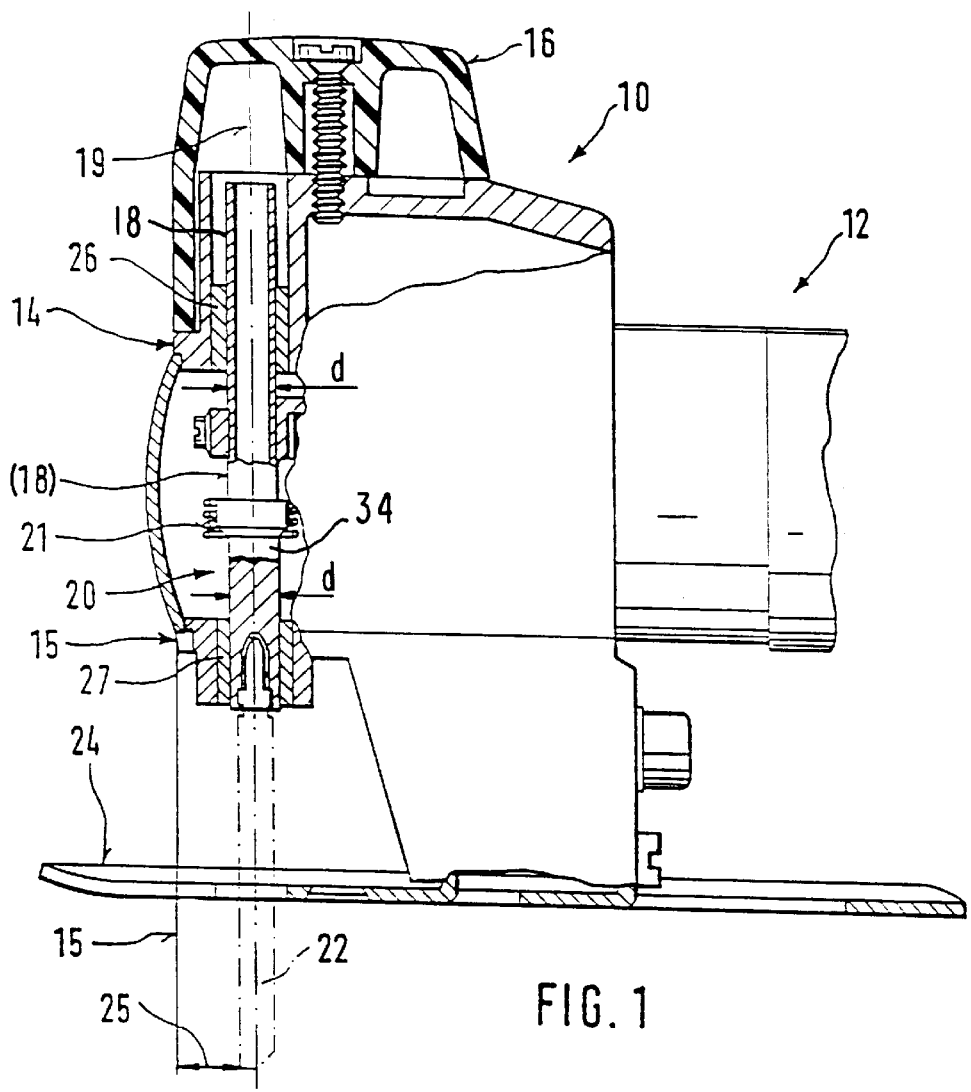
FIG. 1 shows the longitudinal section through a sabre saw of the invention.

FIG. 1 is a longitudinal section through a sabre saw machine 10, with a machine housing 12 acting as the main hand grip and a gear box 14. A knoblike supplementary handle 16, used for the sake of securely holding the sabre saw machine 10, is disposed on the upper part of the gear box 14.

In the front region of the gear box 14, there is a reciprocating rod 18, with a reciprocating rod axis 19 indicated by dot-dashed lines. The lower end of the reciprocating rod 18, positioned in the interior of the gear box 14, carries a chucking device 20 for the saw blade 22, and the chucking device is surrounded by a torsion spring 21 and is also disposed in the interior of the gear box 14. The machine housing 12 is disposed to be adjustable together with the gear box 14 on a base plate 24.

The spacing, designated by reference numeral 25, between the front face end 15 of the gear box 14 and the reciprocating rod axis 19 is especially small in the present exemplary embodiment.

The reciprocating rod 18 is guided in one upper and one lower reciprocating rod bearing 26, 27.

Figures 2A, 2B:
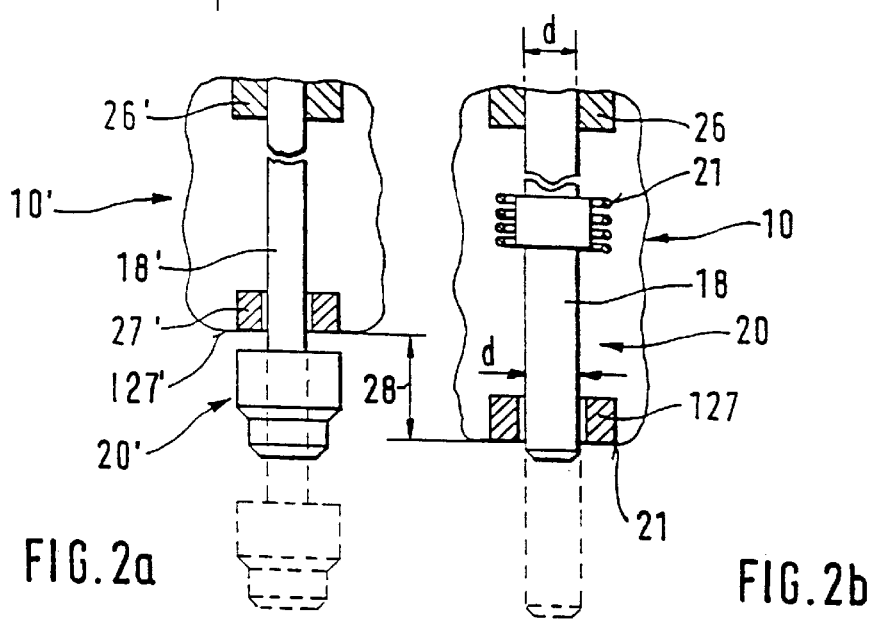
FIG. 2*a* is a schematic cross section through the reciprocating rod bearing of a sabre saw of the prior art.
FIG. 2*b* is a schematic cross section through the reciprocating rod bearing a sabre saw of the invention.

FIGS. 2*a*, 2*b* each show a schematic longitudinal section through the reciprocating rod region of a respective sabre saw machine 10, 10' next to one another. The one on the left in terms of the drawing is a sabre saw 10' of the prior art, while that on the right in the drawing is the sabre saw machine 10 of the invention.

Of the two sabre saw machines 10, 10', the reciprocating rod 18, 18', the upper reciprocating rod bearing 26, 26', the lower reciprocating rod bearing 27, 27' and the chucking device 20, 20' can all be seen. Reference numeral 28 indicates the dimensional difference between the lower edges 127, 127' of the lower reciprocating rod bearing 27, 27', when the lower ends of the reciprocating rod are disposed at the same level.

It can be seen from this that in the sabre saw machine 10 of the invention, the spacing between the upper reciprocating rod bearing 26 and the lower reciprocating rod bearing 27 is markedly greater than the spacing between the upper reciprocating rod bearing 26' and lower reciprocating rod bearing 27' of the sabre saw machine 10' of the prior art.

Increasing this spacing 28 is possible according to the invention by means of the interface, shifted into the interior of the gear box 14, between the reciprocating rod 18 and the chucking device 20; the reciprocating rod 18 is circumferentially engaged on its outside by the torsion spring 21, without requiring a separate housing for this spring. As a result of this arrangement, an especially slender design of the chucking device 20 is possible. The chucking device 20 itself can as a result be guided oscillatingly in the lower reciprocating rod bearing 27 and can plunge into this bearing; preferably the interface between the chucking device 20 and the reciprocating rod 18 does not cross through the reciprocating rod bearing 27.

Figure 3:
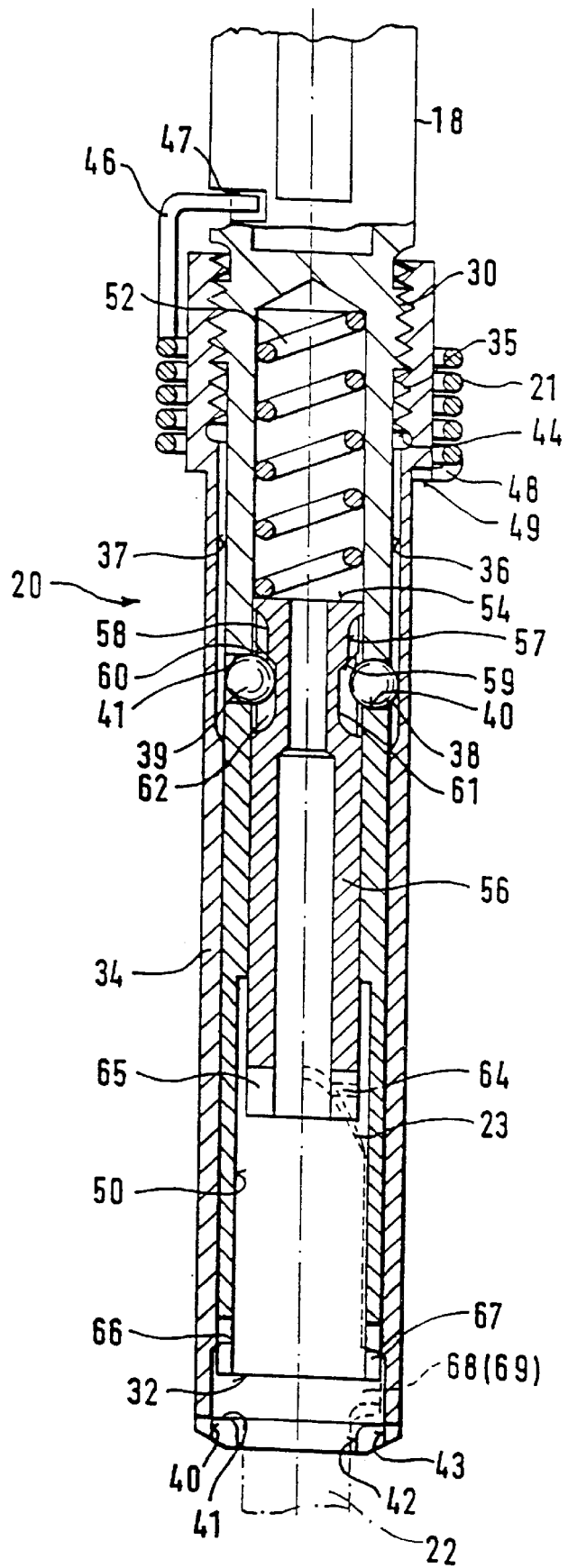
FIG. 3 shows an exemplary embodiment of the chucking device of the invention.

In FIG. 3, a longitudinal section through the chucking device 20 for the saw blade 22 is shown. The reciprocating rod 18 is circumferentially engaged in its upper region concentrically by a torsion spring 21. There, the reciprocating rod 18 has a threaded collar 30, and its extends from this collar axially downward in tubular fashion as far as its terminal edge 32. Between the reciprocating rod 18 and the torsion spring 21, a chucking tube 34, with a female thread region 35, concentrically engages the circumference of the threaded collar 30 of the reciprocating rod 18. On the inside of its upper region, the chucking tube 34 has axial grooves 36, 37, one on each of opposed sides. These grooves allow the entry of detent balls 38, 39, each radially displaceably arranged in a respective radial bore 40, 41 on opposed sides of the reciprocating rod 18. The reciprocating rod 118 has the outer diameter corresponding to the outer diameter of the chucking tube 134 as can be seen from the drawings.

Below the female thread region 35, which is enlarged in collarlike fashion, the chucking tube 34 extends in the form of a continuous cylindrical tube that is smooth on the outside. On its free end, the chucking tube 34 forms a radially inward-extended collar 40, with an upper end face 41 and a through opening 42 for introducing and chucking the chucking end 23 of the saw blade 22.

On the inside, between the female thread region 35 and the axial grooves 36, 37, the chucking tube 34 has an undercut 44 extending all the way around. On its outside, the chucking tube 34 is circumferentially engaged by the torsion spring 21, which with its upper spring end 46 engages a radial recess 47 of the reciprocating rod 18 and with its lower spring end 48 engages a radial recess 49 of the chucking tube 34. The torsion spring 21 is prestressed in such a way that it seeks to move the chucking tube 34 into its axially uppermost position relative to the reciprocating rod 18.

In the region between the threaded collar 30 and the terminal edge 32 of its free end, the interior of the reciprocating rod 18 is provided with a stepped bore 50. A prestressed compression spring 52 is supported by one end on the bottom of the stepped bore 50 and on the other against a face end 54 of a pistonlike centering piece 56. The compression spring 52 seeks to displace the centering piece 56 axially downward. In the upper region of the centering piece 56, on opposed sides, there are two detent grooves 57, 58, which from the standpoint of the observer change over axially toward the bottom into a respective oblique face 59, 60 and a deep groove 61, 62, for the entry of the detent balls 38, 39.

The lower free end of the centering piece 56 has a central, V-shaped centering slot 64, 65 for the entry of the outermost end of the chucking end 23 of the saw blade.

The reciprocating rod 18, in the region of its terminal edge 32, has a central, V-shaped centering recess 66, 67 for centering the upper edge of the saw blade lugs 68, 69 of the chucking end 23 of the saw blade.

The device 20 functions as follows:

In order to change saw blades, the reciprocating rod 18 and the chucking tube 34 are rotated relative to one another. This can be done with the upper reciprocating rod 18 disposed in a manner fixed against relative rotation by rotating the chucking tube 34 by hand, or by auxiliary means not shown, counter to the force of the torsion spring 21; at the same time, an axial motion of these parts relative to one another ensues, so that the spacing between the terminal edge 32 of the reciprocating rod 18 and the upper end face 41 of the collar 40 increases. In the process, the radial slot 43 (FIG. 5) is positioned in such a way that it is aligned with the plane of the saw blade 22.

In this position, the saw blade 22 can be removed axially downward, and the centering piece 56, urged by the compression spring 52, follows along with the axial motion of the saw blade 22. In the axial displacement of the centering piece 56, the oblique faces 59, 60 come to rest on the detent balls 38, 39. These balls are thereby displaced radially outward in the radial bores 40, 41 and begin to the enter the axial grooves 36, 37 of the chucking tube 34. Upon further axial displacement of the centering piece 56, the detent grooves 57, 58 fit over the insides of the detent balls 38, 39. They thus prevent the radial inward motion of the balls or press them radially outward until they contact the bottom of the axial grooves 36, 37. This arrests the chucking tube 34 relative to the reciprocating rod 18 so that it cannot rotate back into its outset position.

In practical use, the described courses of motion succeed one another so rapidly that the saw blade 22 is ejected in the final rotary position of the chucking tube 34, and the chucking tube 34 is held firmly in this position, locked by the mechanism of the chucking device. The user can hold the sabre saw 10 of the invention with one hand and can easily remove the saw blade 22 with his other hand, without using additional tools. When a new saw blade is being inserted into the chucking device 20, the courses of motion described above proceed in reverse order. Once the chucking end 23 of the saw blade has reached the centering slot 64 of the centering piece 56, it carries the centering piece 56 axially along with it upon further axial displacement. The deep grooves 61, 62 thus reach a position that is aligned relative to the detent balls 38, 39, so that these balls can move radially into these grooves, emerging from the detent grooves 57, 58 of the chucking tube 34 or being forced outward by running up against the groove walls. This unlocks the chucking tube 34. As a consequence of the prestressing force of the torsion spring 21, the chucking tube 34 moves to its outset position. As a result, the radial slot 43 in the lower end of the chucking tube 34 rotates in such a way that the collar 30 engages the lower edges of the saw blade lugs 68, 69 from below, thus axially tensing the saw blade 22 and securing it against falling out of the chucking device 20. This makes it clear that when a new saw blade 22 is inserted, the chucking tube 34 itself need not be actuated; instead, the newly inserted saw blade 22 automatically locks itself.

Figure 4:
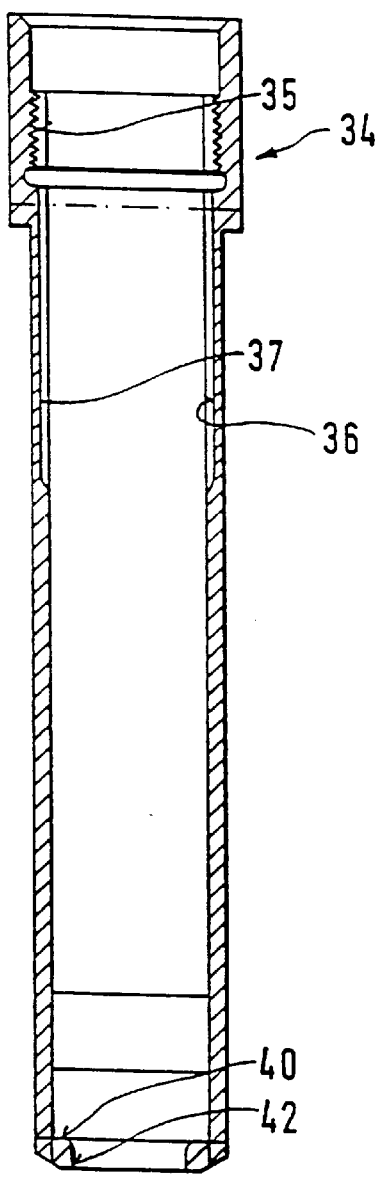
FIG. 4 shows the chucking tube of FIG. 3 in longitudinal section.

FIG. 4 shows a sectional view of the chucking tube 34 of FIG. 1; the female thread region 35 and the axial grooves 36, 37, the collar 40, and the through opening 42 are clearly visible.

Figure 5:
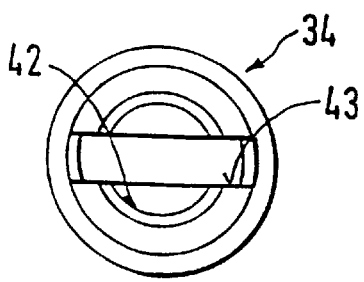
FIG. 5 is a view from below of the chucking tube of FIG. 4.

In FIG. 5, the chucking tube 34 is shown from below, and the through opening 42 and radial slot 43 are clearly visible.

The through opening 42 and the radial slot 43 cooperate with the chucking end 23 of the saw blade in the same way as a keyhole cooperates with the key: Once the key is turned in the keyhole, it cannot be removed axially.

Figure 6:
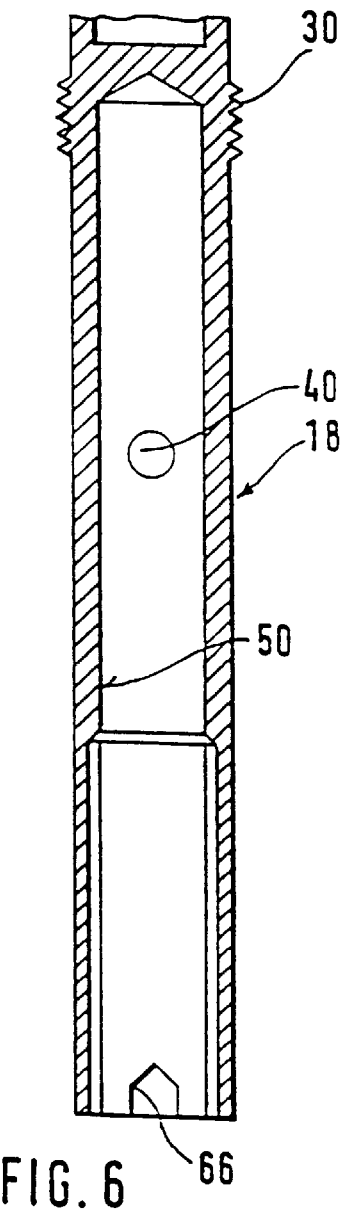
FIG. 6 is a longitudinal section through the lower region of the reciprocating rod of FIG. 3.

In FIG. 6, the reciprocating rod 18 is shown, and the threaded collar 30, radial bore 40, stepped bore 50 and centering recess 66, 67 are clearly visible.

FIG. 7 shows a sectional view of the centering piece 56, clearly showing the embodiment of the detent groove 57, the oblique face 59 and the deep groove 61 as well as the centering slot 64.

FIG. 8 shows a side view of a detail of FIG. 7 in the region of the centering slot 64, clearly showing the V shape of the centering slot 64.

FIG. 9 shows the reciprocating rod 18 as a structural unit, together with the device 20 for chucking the saw blade 22; the slight difference in diameter between the reciprocating rod 18 and the chucking tube 34 can be seen clearly. The lengths of the reciprocating rod bearings 26, 27 are also indicated by dimensional arrows in the top dead center position of the reciprocating rod 18. The stroke length is clearly shown by dimensional arrows 70, 71 below the reciprocating rod bearings 26, 27.

From this, in conjunction with the previous drawings, it becomes clear that the chucking end 23 of the saw blade, during the stroke of the reciprocating rod 18, is moved back and forth by the lower reciprocating rod bearing 27, and thus the supporting moment in the lower reciprocating rod bearing 27 during sawing can be reduced compared with the known versions. The saw blade 22 is fastened especially stably against unintended positional change, and an especially rigid unit is formed between the reciprocating rod 18 and the saw blade 22 along the reciprocating rod axis 19.

Figure 10A:
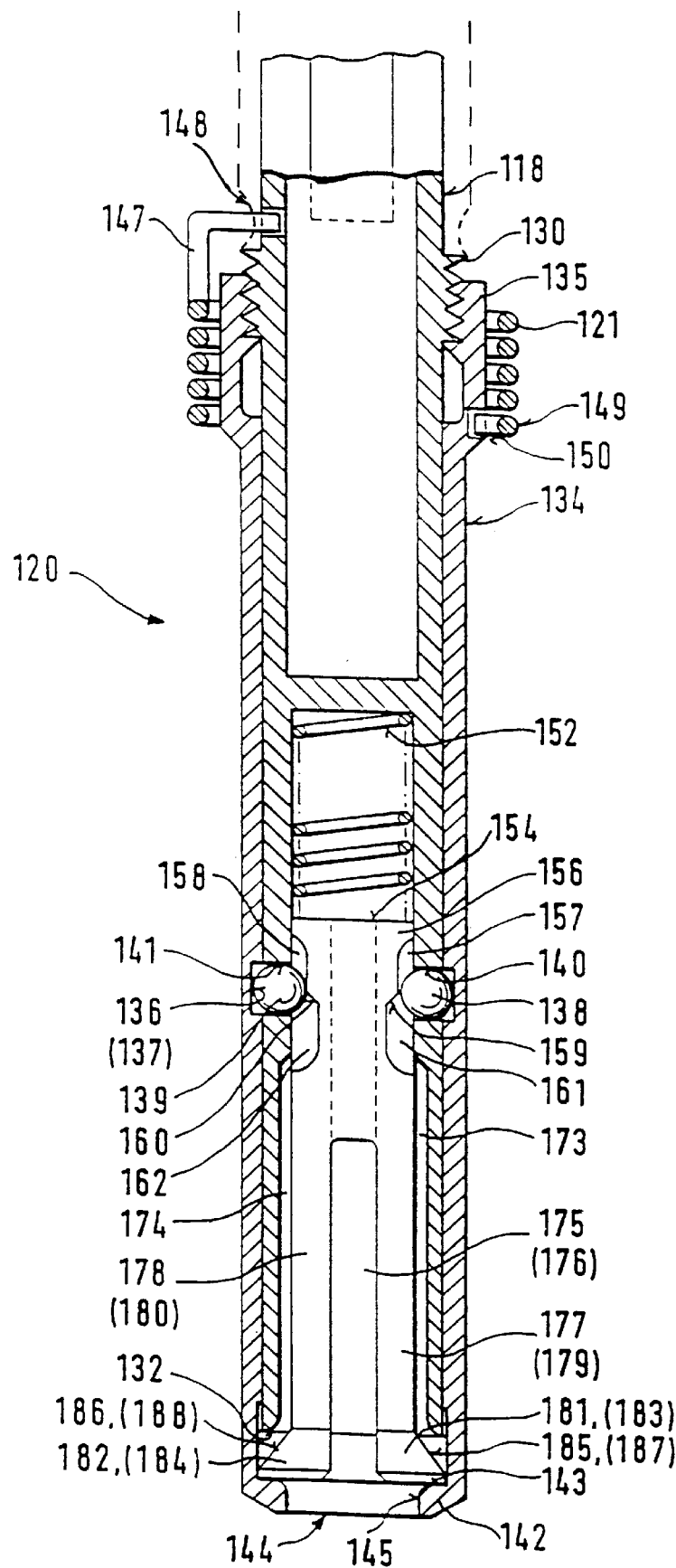
FIG. 10*a* is a sectional view of a further exemplary embodiment of the chucking device in the release position.
Figure 10B:
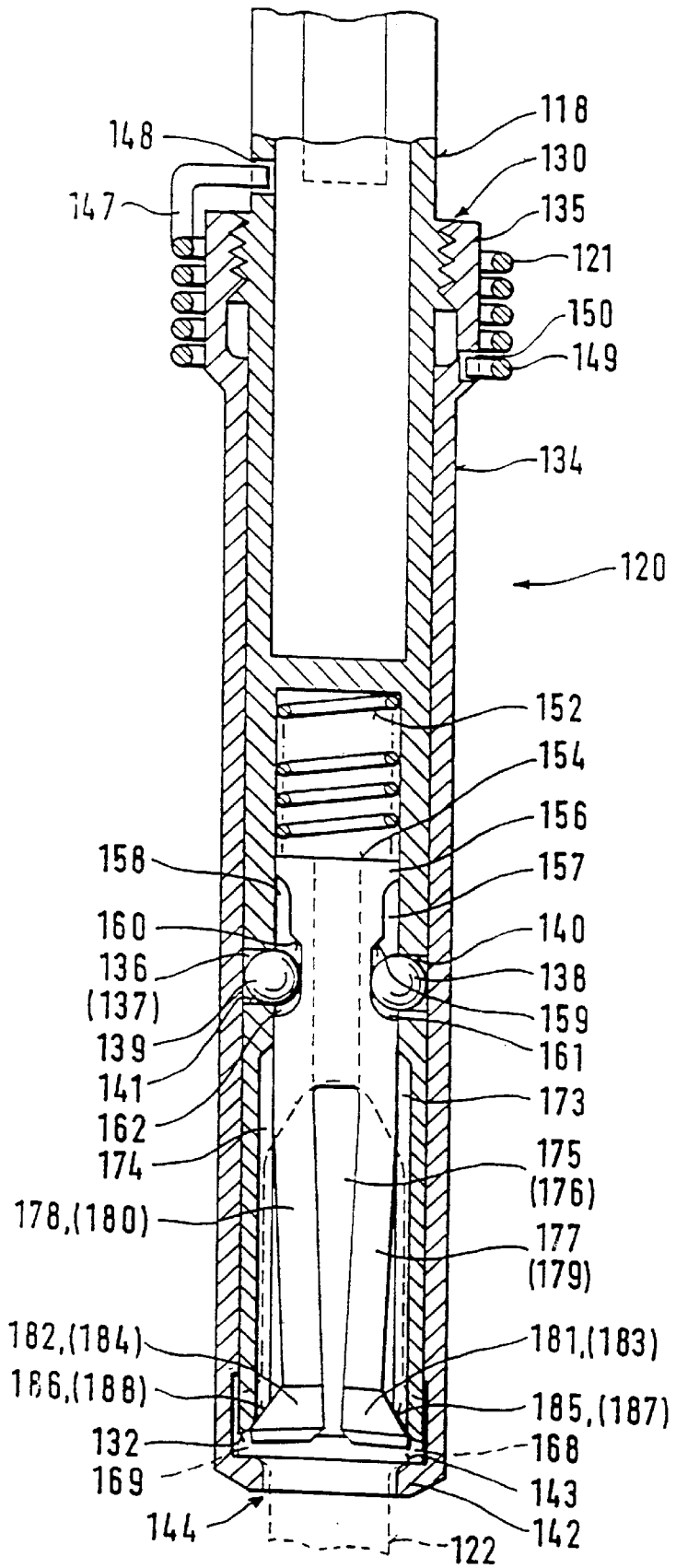
FIG. 10*b* shows the same chucking device in the chucking position.

In FIGS. 10a, 10b, a further exemplary embodiment of the device 120 for chucking a saw blade 122, with the slender design corresponding to the previous drawing figures, is shown in two functional positions. FIG. 10a shows the device 120 in the release position for the saw blade 122, with the chucking tube 134 locked in its axially lowermost position, and FIG. 10b shows the device 20 in the chucking position for the saw blade 122, with the chucking tube 134 retained in its axially uppermost position.

A reciprocating rod 118 has a threaded collar 130 and extends from it, in the form of a cylindrical tube smooth on the outside, as far as the lower terminal end 132. Detent balls 138, 139 are seated in radial bores 140, 141 disposed in the lower region of the reciprocating rod 118.

The reciprocating rod 118 is concentrically engaged on its circumference by a chucking tube 134. The chucking tube 134 is screwed to the threaded collar 130 via a female thread piece 135 and is embodied on its outside, below the collar-like female thread piece 135, as a smooth tube. On its free end, the chucking tube 134 has a radially inward-drawn collar 142. The collar has an axial support face 143 on its inside, and its radially inner edge forms a through opening 144 with a radial slot 145.

Substantially cylindrical clamping tongs 156 in the interior of the tubular reciprocating rod 118. A compression spring 152 is supported against the upper face end 154 of the tongs and seeks to push the clamping tongs 156 axially downward.

The clamping tongs 156 are guided displaceably, in a manner fixed against relative rotation, in axial guide grooves 173, 174 in the inner wall of the reciprocating rod 118. Near the upper face end 154, the clamping tongs 156 have one radial detent groove 157, 158 on each of opposed sides of the cylinder jacket. The groove bottom changes over into a radially inward-pointing oblique face 159, 160 and deep grooves 161, 162. These grooves are disposed in alignment with the respective adjacent radial bores 140, 141 in the reciprocating rod 118.

The clamping tongs 156 have two transverse slots 175, 176, which extend crosswise to one another and intersect one another crosswise and in this way divide the lower region of the clamping tongs 156 into four clamping jaws 177, 178, 179, 180.

Each clamping jaw 177–180 ends in the lower region in the form of a conical bell 181–184, each with a respective outer conical face 185–188. The conical faces 185–188 come to rest in the lower face end 132 of the reciprocating rod 118 as the clamping tongs 156 are tightened, so that upon a further axial motion they are moved radially, for chucking the saw blade 122 as shown in FIG. 10b.

The female thread piece 135 of the chucking tube 134 is concentrically engaged on its circumference by a torsion spring 121, which with its upper end 147 engages a radial recess 148 in the reciprocating rod 118 and with its lower end 149 engages a radial recess 150 in the chucking tube 134 and is prestressed.

In FIG. 10a, the clamping tongs 156 are shown in the releasing position. The conical bells 181–184, in their lower stop position, are braced on the end face 143 of the collar 142.

In FIG. 10b, the axially upward-displaced conical bells 181–184, in the clamping position where they contact the terminal edge 132 of the free end of the reciprocating rod 118, are maximally deflected radially inward. This decreases the width of the slot 176, and the insides of the clamping jaws 177–180 are braced clampingly against the flat sides of the chucking end of the saw blade 122.

Adjacent to and in alignment with each of the radial bores 140, 141, the chucking tube 134 has a respective locking nut 136, 137 to allow the entry of the detent balls 138, 139 for torsionally locking it.

The following operational sequences occur when a saw blade of the device 120 is changed: With the drive of the sabre saw in repose, the chucking tube 134 is rotated relative to the reciprocating rod 118 in such a way that it moves axially downward relative to the reciprocating rod 118 of FIG. 10a, counter to the prestressing force of the torsion spring 121. The saw blade 122 follows this axial displacement, and its saw blade lugs 168, 169 are supported on the upper end face 143 of the collar 142. The clamping tongs 156, because of the prestressing force of the compression spring 152, follow the saw blade 122. In the process, the clamping jaws 77–80 move radially outward, while their conical bells 181–184 slide along the conical faces 185–188 of the reciprocating rod 118. This causes the clamping action on the saw blade 122 to lessen. The radial slot 145 in the through opening 144 of the collar 152 moves with its axis into the plane of the saw blade 122. The path to the outside is thus opened up for the lugs 168, 169. The saw blade 122 can be removed in the axial direction.

Upon axial displacement, the clamping tongs 156, with their oblique faces 159, 160, have adjusted the detent balls 138, 139 radially outward into the locking grooves 136, 137 of the chucking tube 134—as shown in FIG. 10*a*. On displacement of the clamping tongs 156 into the releasing position, their detent grooves 157, 158 fit over the insides of the detent balls 138, 139 and thereby retain these balls firmly in their position in the locking grooves 136, 137 of the chucking tube 134.

As a result, in the release position, the chucking tube 134 is locked relative to the reciprocating rod 118. The chucking tube 134 is prevented from obeying the force of the torsion spring 122 and moving back into the axially uppermost position. It can do that only whenever a saw blade is again introduced, by its chucking end 123, into the through opening 144 or radial slot 145 into the crosswise slot 176. As soon as the chucking end 123 of the saw blade, with its uppermost free region, strikes the end of the centering slot 176, then upon further insertion of the saw blade 122 the clamping tongs 156 are displaced axially upward, counter to the force of the compression spring 152. The detent grooves 157, 158 release the detent balls 138, 139. As soon as these balls are located adjacent the deep grooves 161, 162, they enter these grooves in the radially inward direction, being displaced by the locking grooves 136, 137. This unlocks the chucking tube 134 relative to the reciprocating rod 118, and the chucking tube can move back into its chucking position. In that position the upper end face 143 of the collar 142 is braced axially on the saw blade lugs 168, 169. The conical bells 181–184 are displaced axially, via the chucking end 123 of the saw blade supported in the centering slot, toward the conical faces 185–188 of the face end 132 and slide along them. In that process, they are all displaced together radially inward into their chucking position, as shown for the conical bell 182'. As a result, the saw blade 122 is clamped by the clamping tongs 156 over a large area and especially securely against torsion and fluttering.

I claim:

1. A saber saw machine, comprising a saw blade having a chucking end with lugs; a reciprocating rod having a lower end; a device for chucking said saw blade on said lower end of said reciprocating rod, said device including a chucking tube which is axially displaceable on a reduced diameter portion of said reciprocating rod and has a lower end with an inward-protruding encompassing collar, said collar having a through opening and a radial slot, said collar in a chucking position being braced axially against said lugs of said chucking end of said saw blade; upper and lower bearings, said reciprocating rod being in guiding contact with said upper bearing, and said chucking tube being in guiding contact with said lower bearing, said chucking tube jointly with said chucking end of said saw blade passing through said lower bearing during a stroke of said reciprocating rod.

2. A saber saw machine as defined in claim 1, wherein a portion of said reciprocating rod above the reduced diameter portion has a same outer diameter as said chucking tube.

3. A saber saw machine as defined in claim 1; and further comprising a centering piece formed as clamping tongs, said chucking tube being concentrically engageable with a circumference of said centering piece.

4. A saber saw machine as defined in claim 1; and further comprising overlooking means which automatically lock said chucking tube relative to said reciprocating rod when said chucking tube reaches a rotary position that releases said saw blade, said overlooking means being releasable by said saw blade when said saw blade is inserted into said chucking device.

5. A saber saw machine, comprising a saw blade having a chucking end with lugs; a reciprocating rod having a lower end; a device for chucking said saw blade on said lower end of said reciprocating rod, said device including a chucking tube which is axially displaceable on a reduced diameter portion of said reciprocating rod and has a lower end with an inward-protruding encompassing collar, said collar having a through opening and a radial slot, said collar in a chucking position being braced axially against said lugs of said chucking end of said saw blade; upper and lower bearings, said reciprocating rod being in guiding contact with said upper bearing, and said chucking tube being in guiding contact with said lower bearing said chucking tube jointly with said chucking end of said saw blade passing through said reciprocating rod bearing during a stroke of said reciprocating rod; a gear box; and a torsion spring circumferentially engaging said chucking tube, said chucking tube having an upper region supported jointly with said torsion spring in an interior of said gear box.

6. A saber saw machine, comprising a saw blade having a chucking end with lugs; a reciprocating rod having a lower end; a device for chucking said saw blade on said lower end of said reciprocating rod, said device including a chucking tube which is axially displaceable on a reduced diameter portion of said reciprocating rod and has a lower end with an inward-protruding encompassing collar, said collar having a through opening and a radial slot, upper and lower reciprocating rod bearings in which said bearings, said reciprocating rod being in guiding contact with said upper bearing, and said chucking tube being in guiding contact with said lower bearing, said chucking tube jointly with said chucking end of said saw blade passing through said lower bearing during a stroke of said reciprocating rod; overlooking means which automatically lock said chucking tube relative to said reciprocating rod, when said chucking tube reaches a rotary position that releases said saw blade, said overlooking means being releaseable by said saw blade when said saw blade is inserted into said chucking device; and at least one detent ball which acts as said overlooking means and is displaceable back and forth between said chucking tube and a centering piece.

7. A saber saw machine as defined in claim 6, wherein said reciprocating rod has a recess, said chucking tube having a groove, said centering piece having a detent groove, said detent ball being guided in said recess of said reciprocating rod and being movable back and forth in said recess from said groove of said chucking tube into said detent groove of said centering piece and vice versa.

8. A saber saw machine as defined in claim 7, wherein said detent groove of said centering piece merges into a deep groove with oblique faces.

9. A saber saw machine as defined in claim 8, wherein by displacement of said centering piece by said chucking of said saw blade, said detent balls pass from said groove of said chucking tube into said deep groove of said centering piece and thus undo a locking of said chucking tube.

* * * * *